United States Patent [19]

Monroe

[11] Patent Number: 4,741,504

[45] Date of Patent: May 3, 1988

[54] UTILITY RACK FOR DRAFTING IMPLEMENTS

[76] Inventor: James W. Monroe, 7720 Lexington Ave., West Hollywood, Calif. 90046

[21] Appl. No.: 935,945

[22] Filed: Nov. 28, 1986

[51] Int. Cl.⁴ ............................................. E04G 3/00
[52] U.S. Cl. .................... 248/286; 248/231.6
[58] Field of Search ............... 248/231.7, 286, 278, 248/231.5, 231.4, 231.6, 229, 287; 108/28, 29, 30; 403/205

[56] References Cited

U.S. PATENT DOCUMENTS

| | | | |
|---|---|---|---|
| 672,062 | 4/1901 | Hanstein | 248/278 X |
| 964,493 | 7/1910 | Coder | 248/286 X |
| 1,041,002 | 10/1912 | Bergh | 248/278 |
| 1,154,838 | 9/1915 | Best | 248/286 |
| 1,360,531 | 11/1920 | Hyatt | 248/278 X |
| 1,409,233 | 3/1922 | Pataky | 248/231.5 X |
| 1,420,353 | 6/1922 | White | 248/231.5 X |
| 1,461,955 | 7/1923 | Williams | 248/278 |
| 1,878,850 | 9/1932 | Hilgers | 248/231.7 X |
| 2,709,565 | 5/1955 | Tousignant | 248/278 |
| 2,947,423 | 8/1960 | Ekstrom | 108/30 |

Primary Examiner—J. Franklin Foss
Attorney, Agent, or Firm—Roger A. Marrs

[57] ABSTRACT

A utility rack is disclosed herein for removably holding a variety of accesories and implements useful in the field of drafting. The rack includes a base detachably connected to a drafting table for supporting an articulated support arm having an elongated mounting member adjustably carried on the cantilevered end thereof. The rack is fully adjustable for height and angle above the drafting table surface as well as longitudinal adjustment of the mounting member along the length of the table. A plurality of hangers are slidably carried along the length of the mounting member for holding the variety of accessories and implements.

7 Claims, 1 Drawing Sheet

U.S. Patent
May 3, 1988
4,741,504
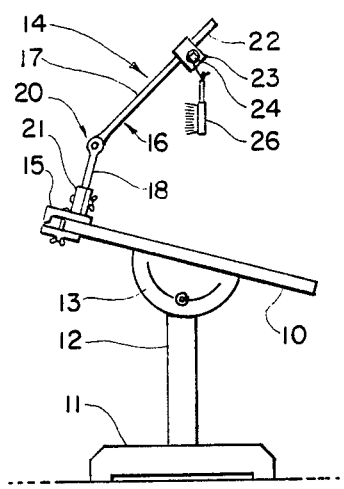
FIG. 1.
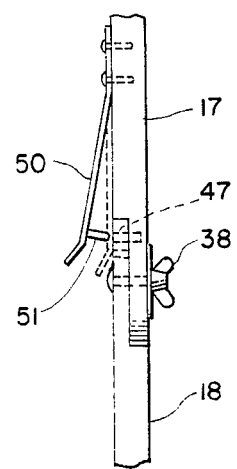
FIG. 4.
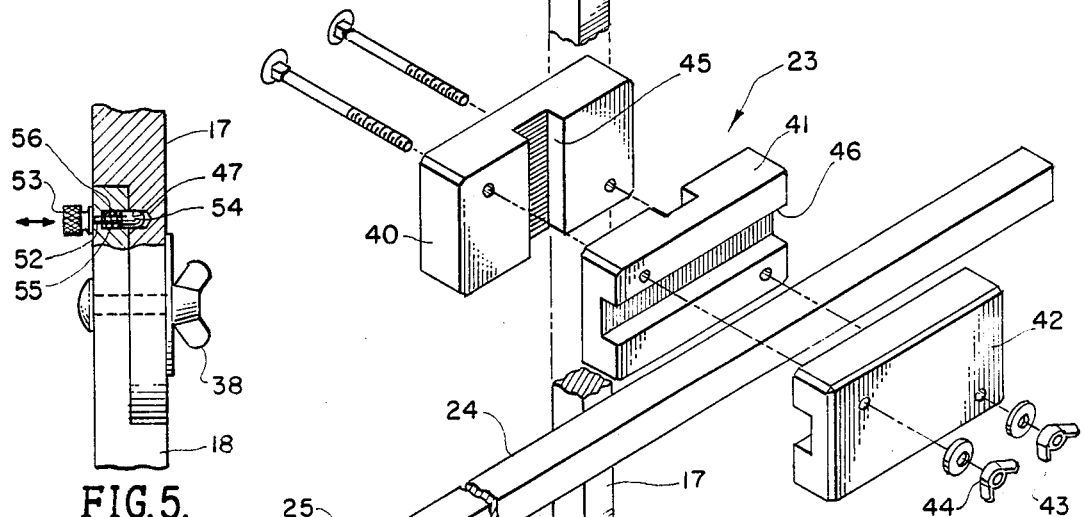
FIG. 5.
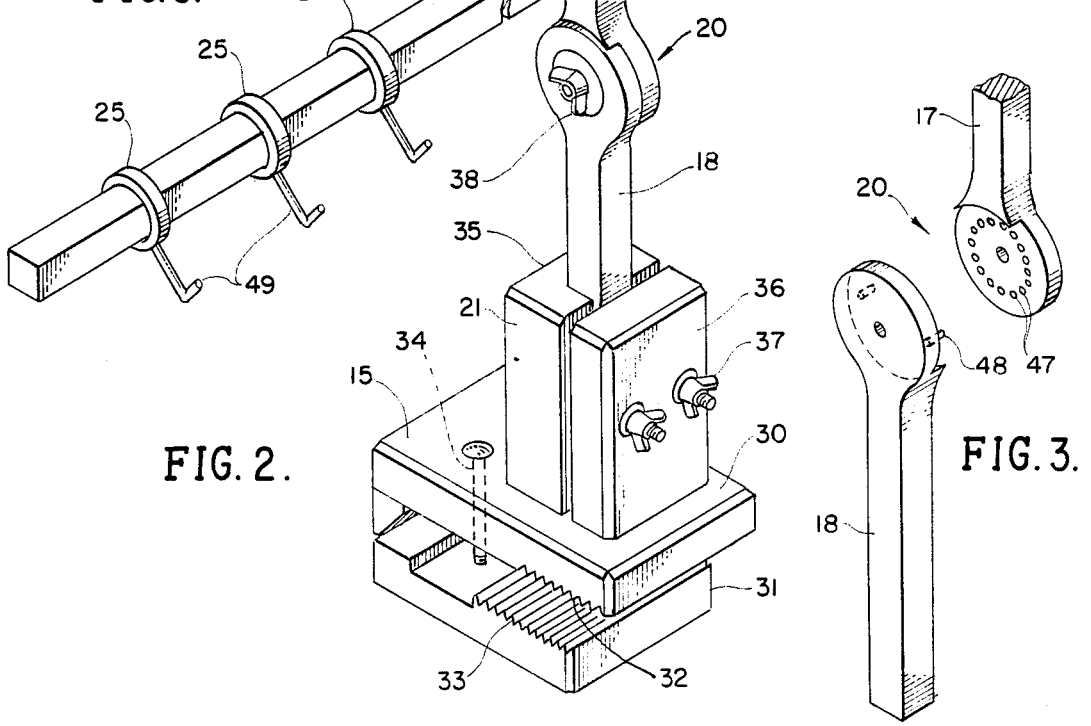
FIG. 2.
FIG. 3.

UTILITY RACK FOR DRAFTING IMPLEMENTS

BACKGROUND OF THE INVENTION

1. Field of the Invention

The present invention relates to utility racks and more particularly to a novel rack for supporting a plurality of drafting instruments, accessories or implements over a drafting table surface within easy reach of the draftsman.

2. Brief Description of the Prior Art

It has been the conventional practice for draftsmen to prepare drawings on a table having a work surface oriented in a substantially horizontal plane. The working surface provides an area for the placement of a variety of drafting tools and implements which are within reach of the draftsman as he is performing his drafting or drawing work. Since the working surface of a drafting table is very large, edge marginal regions of the table are generally available for the placement or storage of such accessories or implements.

Difficulties and problems are encountered when the draftsman tilts, slants or otherwise orients the table to an angular position with respect to the horizontal plane. Naturally, gravity will not permit the accessories, tools and implements to rest on the working surface and such accessories and implements will roll or fall from the working surface to the floor In order to counteract this problem, the implements and accessories must be placed on an adjacent table or cabinet which is not always within easy reach of the draftsman and requires the addition of the cabinet to the drafting table. Also, conventional drafting practice does not permit for a holder which will readily keep the implements and accessories used during the drafting procedure in a special or given area on the working surface of the board and does not place such items in an orderly fashion for ready use.

Therefore, a long standing need has existed to provide a novel rack for holding such accessories and implements in an orderly fashion within ready reach of the draftsman and which will be readily carried on the drafting table itself regardless of the angular orientation of the working surface.

SUMMARY OF THE INVENTION

Accordingly, the above problems and difficulties are obviated by the present invention which provides a novel utility rack for storing a plurality of tools, accessories and implements useful in a drafting procedure which comprises base means for attachment to the edge marginal region of a drafting table and an upstanding support arm having one end attached to the base means so that its opposite end will upwardly project in a cantilevered fashion to terminate with a coupling means holding a transverse mounting member. The support arm is articulated by means of a movable joint or elbow having releasable securement means for holding the arm at a desired angle. A plurality of hangers are downwardly depending from the mounting member on which individual implements, accessories or tools can be suspended over the working surface of the drafting table. Therefore, the tools are not maintained on the working surface as is the conventional practice and the drafting table can be slanted or angled with respect to the horizontal without fear of the implements and accessories falling to the floor.

Therefore, it is among the primary objects of the present invention to provide a novel utility rack for holding a variety of drafting implements, accessories and the like so that such items are held in a position over the working surface of a drafting table within easy reach of the draftsman.

Another object of the present invention is to provide a utility rack having a plurality of hangers slidably carried across the surface of the drafting table on which a plurality of drafting implements can be removably suspended.

Another object of the present invention is to provide a novel utility rack for drafting implements upwardly cantilevered from a support base by means of an articulated arm that may be readily adjusted for angular displacement with respect to the working surface of the drafting table and which includes a mounting bar on its terminating end for supporting a plurality of drafting implements from a multiplicity of hangers.

Yet a further object of the present invention is to provide a novel utility rack which is economical to manufacture and may be readily used without employment of special tools in such a manner that a variety of drafting implements can be suspended over the working surface of a drafting table.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a reduced illustration and side elevation of a typical drafting table mounting the novel utility rack of the present invention;

FIG. 2 is an enlarged exploded perspective view showing the novel utility rack illustrated in FIG. 1;

FIG. 3 is a perspective view of the articulated support arm used in the utility rack of FIGS. 1 and 2;

FIG. 4 is a side view of another version of a movable joint connecting the ends of the limbs; and FIG. 5 is still another view thereof.

DESCRIPTION OF THE PREFERRED EMBODIMENT

Referring to FIG. 1, a conventional or typical drafting table is indicated by numeral 10 that is mounted on a base 11 by means of a central stanchion 12. An adjustable quadrant 13 interconnects the top of stanchion 12 with the underside of the drafting table or board 10 and permits the board to be adjusted to an angular position with respect to a horizontal plane. The board 10 is illustrated as being slanted whereby drafting implements and accessories which would normally be placed on the working surface of the board would slide or drop from the working surface onto the floor. Therefore, the inventive utility rack of the present invention is employed for holding such implements within reach of the draftsman.

The utility holder is illustrated in the general direction of arrow 14 which includes a base 15 that may take the form of a C-shaped clamp, as illustrated, or may take the form of other adjustable or detachably connectable means incorporated into the edge of the table itself or which may use another type of base means attached to the top of the table surface. The base means 15 includes an articulated support arm 16 comprising an upper limb 17 and a lower limb 18. The adjacent ends of the limbs 17 and 18 are connected together by means of an adjustable joint indicated by numeral 20. The opposite end of limb 18 from its end constituting joint 20 is insertably received into an opening provided in an upright element 21 carried on the base means 15. The opposite end of limb 17 from its end joins with connection 20 and terminates in a free end 22 that carries a junction block 23. The junction block is also employed for slidably mounting an elongated horizontally disposed mounting member 24 on which a plurality of holding hangers 25 are disposed for supporting a variety of drafting implements such as a brush 26.

Referring now in detail to FIG. 2, it can be seen that the base means 15 may include a pair of jaws 30 and 31 having opposing serrated edges 32 and 33 which oppose one another and are intended to press against the underside and topside of the edge marginal region of the drafting table 10. A wing nut fastener passes through opening 34 registered between the two jaws so that the jaws may be tightened against the respective surfaces of the edge marginal region of table 10. Suitably carried on the upper jaw 30 is a clamp-like mounting component 21 having a fixed portion 35 secured to the jaw 30 and a clamp component 36 adapted to be drawn into abutment by means of wing nuts such as wing nut 37. The stationary or fixed component 35 of the mount includes a central aperture or opening into which the lower end of the lower limb 18 is insertably received. Once situated within the opening, the clamp block 36 is drawn tight so the limb 18 is firmly held in position.

The articulated support arm 16 includes limb 17 which is attached to one end of the limb 18 by means of the adjustment elbow 20. The respective ends of the limbs are reduced in thickness so they may be pressed together by means of a wing nut adjustment fastener 38 in order to rigidize the arm and maintain the limb in fixed position. Preferably, the joint or elbow 20 is circular so that portions of the limbs' thicknesses overlap whereby the overall thickness of the support arm is constant throughout its length.

Referring in further detail to FIG. 2, it can be seen that the upper terminating end 22 of limb 17 carries a mounting block 23 in clamping sections comprising end section 40 and central section 41 and another end section 42. It is noted that the opposing faces of end section 40 and central section 41 include grooves midway between the opposite ends of the section which are registered with one another to provide an elongated slot through which end 22 of limb 17 passes. Also, the opposite surface of central section 41 and the opposing surface of the other end section 42 are provided with longitudinal grooves extending horizontally which, when registered, provide a central longitudinal passageway for slidably carrying the mounting member 24. The sections are held together by adjustable wing nut fasteners indicated by numerals 43 and 44 respectively It should be noted that the registered groove of blocks 40 and 41 is indicated by numeral 45 and that the groove is normal or at a 90° orientation with respect to the horizontal groove 46 defined by the grooves provided in the opposing surfaces of central section 41 and the other end section 42.

FIG. 2 also shows that there is a multiplicity of hangers 25 carried along the length of the mounting bar or member 24. Each of the hangers is preferably of circular configuration in side elevation with a downwardly depending hook portion such as the hook portion 49 of hanger 25. Each of the hangers may slide independent of other hangers and it is to be understood that the mounting bar or member 24 may be oriented more on one side or the other of the support arm as desired. Furthermore, the mounting bar or member 24 may be elevated above the surface of the table 10 by sliding limb 17 through the groove 45 to a desired position and then tightening the wing nuts 43 and 44. The entire assembly is rigidized when all of the wing connectors are tightened so that the proper position and orientation of the mounting bar is maintained.

Referring now in detail to FIG. 3, it can be seen that the limb 17 may be angularly disposed with respect to limb 18 by providing a plurality of holes such as hole 47 in the face of the reduced thickness end of limb 17 and by providing a pair of outwardly projecting pins such as pin 48 carried on the opposing face of the reduced portion of limb 18. By inserting the pair of pins 48 into respective openings or holes 47, the limb 17 is angled with respect to the limb 18 at a desired slant. The wing nut 38 has been tightened to ensure insertion of the pins in the respective holes so that the support arm 16 is now rigid.

In view of the foregoing, it can be seen that the utility rack 14 of the present invention may be used in connection with a table 10 regardless of the angular orientation of the working surface with respect to the ground or floor. The rack positions a mounting bar 24 in a cantilevered fashion well over the working surface of the table and a variety of drafting implements and accessories are held in a downwardly depending fashion from hangers across the length of the mounting bar. The user, such as a draftsman, may readily select a drafting implement from a particular hanger and remove it therefrom for use followed by returning the implement to its storage position on the respective hanger. The mounting bar may be moved from side to side through the mounting block 23 by loosening and then retightening the wing nut fasteners 43 and 44 and the mounting bar may also be elevated by moving the block 23 along the length of the limb 17 via the same wing nuts 43 and 44. Furthermore, the angle may be readily changed by loosening and then tightening the wing nut 38 so that the limb 17 may be positioned at a selected angle with respect to the limb 18. It is also to be understood that alternate space means can be provided other than the clamp illustrated in the FIGS. 1 and 2. Such alternate mounting may take the form of a hole or aperture in the edge marginal region of the table 10 through which the lower limb 18 may be positioned. Stop means may be provided on the table or on the limb so that the limb will not extend through the table aperture farther than necessary to support the rack in a selected position.

Referring to FIG. 4, another version of a movable joint coupling the adjacent ends of limbs 17 and 18 is shown. A plurality of spaced apart holes 47 are arranged in a circle coaxial with the wing nut fastener 38 in the external surface of limb 18. A resilient latch of spring steel, for example, is indicated by numeral 50 which is secured at one end to limb 17. The other end is provided a tab for use in opening the latch to the position shown in solid lines whereby a pin 51 is withdrawn from a selected one of the plurality of holes 47. When withdrawn, the limb 17 may be moved with respect to limb 18 for positioning the rack. When a desired position has been reached, the latch 50 is permitted to spring back to the dotted line position so that pin 51 inserts into one of the holes 47.

FIG. 5 shows another alternate version of the movable joint for limbs 17 and 18 comprising a plunger 52 having an enlarged knurled knob 53 at one end and an enlarged pin 54 on the other end. A coil spring 55 is compressed between the end of the pin and a wall 56 of a recess within limb 17. The knob is manipulated to withdraw the pin from hole 47 to change the position of limb 17 and the rack bar or rod 24. When at the desired rack bar or rod position, the knob is released and the expansive force of the coil spring urges the pin into a selected hole.

When adjusting the limbs, the wing nut fastener 38 is loosened and the upper limb 17 is moved to the desired position. The pins of any of the versions are withdrawn from holes during the movement. The limb 18 is stationary. If desired, the limb 18 may be pivotally attached to the table with a releasable holddown for additional adjustment.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A utility rack for removably supporting a variety of implements comprising the combination of:

base means;

an elongated support member;

support means connecting said support member to said base means;

a plurality of hangers arranged in slidable relationship on said support means having carriers for suspending said variety of implements therefrom, said base means includes a pair of jaws having opposing serrated surfaces for gripping the opposite surfaces of a work table; and fastener means for drawing said pair of jaws together in a clamping action, said support member is a rod or bar slidably carried on a joining block between its opposite ends, said support means is an elongated arm having a pair of limbs joined at adjacent ends in a movable joint;

said joining block coupling said support member to one end of said support means cantilevered away from said base means.

2. The invention as defined in claim 1 wherein:

said joining block is composed of three sections with opposing surfaces of said sections provided with grooves in registry with each other to provide a pair of open-ended passageways through said block at right angle to each other;

one limb of said pair occupying one passageway of the pair and said support member occupying said other passageway of said pair.

3. The invention as defined in claim 2 wherein:

said pair of limbs are joined together at their adjacent ends by said movable joint so that said one limb may be angularly disposed with respect to said other limb.

4. The invention as defined in claim 3 wherein:

means releasably coupling said adjacent limbs together.

5. The invention as defined in claim 4 wherein:

said releasable joining means includes a pair of outwardly projecting pins extending from the end of one limb and a series of holes provided in the other limb arranged in a circle;

said holes adapted to insertably receive said pins to maintain said limb in an angular relationship with respect to said other limb 6. The invention as defined in claim 5 wherein:

said carriers on said hangers include a hook outwardly projecting from said bar or rod.

7. The invention as defined in claim 5 wherein:

said releasable joining means includes a set of holes in one limb of said pair arranged in a circle and a resilient latch carried on said other limb and further having a pin projecting from one end of said latch for insertion into a selected one of said holes.

* * * * *